Nov. 25, 1969  R. L. HAUSER  3,480,492
MEHTOD OF BONDING USING EXOTHERMIC ADHESIVE
ACTIVATED BY ULTRASONIC ENERGY
Filed Feb. 20, 1967
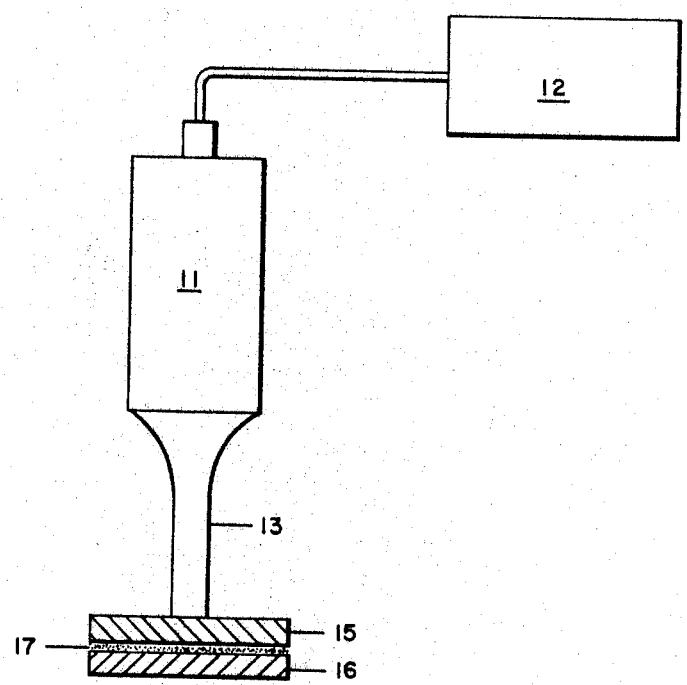
INVENTOR.
RAY L. HAUSER
BY
Ervin B. Steinberg

United States Patent Office 3,480,492
Patented Nov. 25, 1969

3,480,492
METHOD OF BONDING USING EXOTHERMIC
ADHESIVE ACTIVATED BY ULTRASONIC
ENERGY
Ray L. Hauser, Boulder, Colo., assignor to Branson
Instruments, Incorporated, Stamford, Conn., a corporation of Delaware
Filed Feb. 20, 1967, Ser. No. 617,180
Int. Cl. B29c 27/08; B32b 31/16
U.S. Cl. 156—73                                        5 Claims

ABSTRACT OF THE DISCLOSURE

Adhesive material suitable for bonding two parts together using sonic energy for adhesive activation is provided with an ingredient which undergoes an exothermic reaction in order to cause an increase in temperature above that which is normally obtained using sonic energy alone, and which serves to render the surfaces of non-polar materials polar to provide for better adhesive bonding.

---

This invention concerns adhesive material which is useful for providing a bond between two parts and has particular reference to bonding material which is activated by the dissipation of sonic energy.

The bonding together of parts using adhesive material which is activated or reactivated by sonic energy is well known in the art and has been described for instance in U.S. Patent No. 3,284,257 dated Nov. 8, 1966; R. S. Soloff et al. entitled "Method of Bonding Non-Thermoplastic Parts by Sonic Energy" and in the article "Ultrasonics Improve Adhesive Bonding" by R. L. Hauser Design News (magazine), May 25, 1966, page 104, Rogers Publishing Co.

While such bonding has found widespread application, using for instance epoxy type adhesives, it has been discovered that greatly improved results are obtained when the adhesive material includes an admixture or a constituent which undergoes an exothermic reaction during the time sonic energy is applied. The sudden exothermic reaction increases, almost instantaneously, the heat within the adhesive subjected to curing and thereby causes the adhesive to provide a higher bonding strength as will be explained in greater detail in the following disclosure.

One of the principal objects of this invention is, therefore, the provision of a new and improved adhesive material which is particularly useful for bonding in conjunction with the use of sonic energy.

Another important object of this invention is the provision of an adhesive material having a constituent which undergoes an exothermic reaction when sonic energy of a sufficient level is applied.

Another object of this invention is an improved method for bonding materials to each other, particularly a method for obtaining a bond between materials which heretofore could be bonded only with little or moderate success.

A further object of this invention is the provision of an improved bonding method, using sonic energy for activating adhesive material which is interposed between two parts to be bonded, whereby the adhesive material includes a special ingredient which undergoes an exothermic reaction, thereby providing a sudden increase in the curing temperature.

Further and still other objects of this invention will be more clearly apparent from the following description when taken in conjunction with the accompanying drawing in which:

The figure is a schematic illustration of a typical bonding arrangement.

Referring now to the figure, numeral 11 refers to an electro-acoustic converter 11 which provides mechanical oscillations in response to high frequency electrical energy applied thereto from a generator 12. Typically, the frequency is in the order of 20 kilocycles per second, but it shall be understood that the frequency may be either will be understood that the frequency may be either lower or higher, that is in the sonic or in the ultrasonic frequency range. The converter is fitted with a horn 13 which acts as an acoustic impedance transformer to increase the amplitude of oscillations. The converter 11, generator 12 and horn 13 are commercial units and are obtainable for instance as "Sonifier" Ultrasonic Welding Apparatus, Model J–32 from Branson Instruments, Incorporated, Sonic Power Division, Danbury, Conn.

In order to bond a part 15 to a part 16 there is interposed a thin layer of a suitable adhesive material 17. In a typical case, the parts 15 and 16 are two pieces of nylon and the material 17 is a nitrocellulose adhesive. Upon coupling the converter 11 with horn 13 to the part 15 and energizing the generator 12, sonic energy is coupled to the adhesive material 17, the adhesive material dissipates the sonic energy and the resulting increase in temperature caused by the dissipation of energy provides for a very quick and effective curing of the adhesive. The entire process takes but a few seconds of time.

In another typical example, the parts 15 and 16 may be wood, polypropylene, phenolic material and the like, while the adhesive material may comprise epoxy material, vinyl acetate latex in water and the like with an exothermic additive.

In conducting a great number of experiments with various materials it has been found that there are cases where insufficient heat is produced at the bond line during a time cycle which is practical, or before the items to be bonded are deformed by reason of two long a bonding cycle. It has been discovered that these shortcomings can be materially eliminated by formulating the adhesive material in such a manner that it includes a constituent which undergoes an exothermic reaction.

Hence, as the temperature of the ahesive material is raised upon the dissipation of sonic energy, a sudden burst of energy is obtained which results from the exothermic reaction of the additive within the adhesive material. This sudden increase in temperature not only provides a very fast and accelerated curing of the adhesive material itself, but improves also the bond between the part and the adhesive material. Particularly, the wetting action is greatly enhanced. Typical admixtures comprise manganese dioxide ($MnO_2$) and potassium chlorate ($KClO_3$).

Still further, it has been found that certain polymeric plastic materials have surfaces which are characteristically hydrophobic and hence are not strongly bonded by the usual adhesives. Polyethylene, polypropylene, polyacetal and Teflon are examples of plastic materials having hydrophobic surfaces. Since the surfaces of these plastic materials are non-polar they can be successfully bonded only if the surface is first made polar with a chemical or an electrical treatment. Making the surfaces polar can be accomplished concurrent with the activation of the adhesive material if the proper chemicals are included within the formulation of the adhesive material. A separate binder phase is incorporated in the formulation of special adhesives which will adhere in a conventional manner to polar materials such as wood, metals, ceramics and many plastics and elastomers. The purpose of the special adhesive formulation as described heretofore, is to increase the heat generated at the interface between the sonically bonded materials and to render the surface of these materials polar.

Useful additives are potassium chlorate (usually with manganese dioxide catalyst), perchlorates, nitrates, organic or inorganic peroxides and other chemicals of similar behavior. The exothermic reaction ingredient may be in particulate, fibrous, flake, or film geometry and is used with a conventional adhesive in solution, dispersion, latex, film or hot melt form. Preferred formulations involve water latex binders or non-flammable solvents such as the halogenated hydrocarbons.

In order to provide a good bond to plastic parts during ultrasonic activation the special additives should decompose at a temperature which can be reached at the interface. For example, polyacetal (e.g. Delrin) melts at 320 degrees F. and it has been sufficiently bonded using potassium chlorate and manganese dioxide. Additionally, the binder phase of the adhesive should melt near the melting temperature or below that of the plastic to be bonded. Latex compounds tested have appeared to remain stable for at least two months without precipitation of polymer or gelatin. The particles of chlorate and manganese dioxide settled as expected, but they could be redispersed easily with stirring.

Typical adhesive formulations useful for bonding materials by sonic energy and including a constituent which provides for an exothermic reaction are as follows:

Formulation No. 71: Grams
  Nitrocellulose ("Duco" cement) adhesive ____ 3.0
  Potassium chlorate (fine powder) _____ 2.8
  Manganese dioxide (fine powder) stirred by hand _____ 0.1

Formulation No. 122: Grams
  Vinyl acetate latex in water (Franklin's white glue) _____ 10.0
  Potassium chlorate _____ 5.0
  Manganese dioxide _____ 0.2

Formulation No. 123: Grams
  Vinyl acetate latex in water (Franklin white glue) _____ 10.0
  Potassium chlorate _____ 3.3
  Manganese dioxide _____ 0.12

The effect of the additive providing for the exothermic reaction is quite clearly evident from the following tables:

EFFECTS OF ADDITIVES TO NITROCELLULOSE ADHESIVE
[Shear strength (p.s.i.)]

|  | Without additive | With additive |
| --- | --- | --- |
| Nylon/nylon | 450 | 1,470 |
| Phenolic/nylon | 240 | 1,280 |
| Polypropylene/ABS | 18 | 130 |
| Polypropylene/phenolic | 0 | 120 |

EFFECTS OF ADDITIVES IN VINYL ACETATE LATEX ADHESIVE
[Shear strength (p.s.i.)]

| Material | No additive | 3% additive | 23% additive |
| --- | --- | --- | --- |
| Polypropylene/plywood | 0 | 70 | 175 |
| Plywood/polyacetal | 173 |  | 418 |
| Polyacetal/plywood | 400 | 576 |  |
| Nylon/polyacetal | 229 | 284 | 216 |
| Polyacetal/ABS | 381 | 956 | 460 |
| Nylon/polypropylene | 3 | 293 | 235 |

It will be seen, therefore, that not only has it been possible to improve the adhesive strength between materials fastened to each other but that materials which heretofore could be bonded only with moderate success can be bonded with excellent results. It is apparent furthermore, that a certain amount of experimentation is required in order to find the formulation which provides optimum results, but in many cases a variety of formulations which exceed a minimum strength requirement will be found satisfactory.

In summary then the admixture of an ingredient which provides for an exothermic reaction during the bonding cycle increases the adhesive bond and provides also for rendering non-polar surfaces polar during the time that a bond is accomplished.

While there have been described and illustrated certain specific embodiments of the present invention it will be apparent to those skilled in the art that various further changes and modifications may be made without deviating from the broad principle and concept of this invention.

What is claimed is:

1. The method of bonding two parts to each other comprising: interposing adhesive material having a constituent adapted to undergo an exothermic reaction between the two parts to be bonded, coupling sonic energy of sufficient power into said adhesive material to cause the dissipation of sonic energy to raise the temperature of said adhesive material to a point at which the exothermic reaction occurs, such reaction raising the temperature of said adhesive material still further.

2. The process of bonding two parts to each other by sonic energy comprising:
   (a) interposing between two parts to be bonded an adhesive material which includes a constituent adapted to undergo an exothermic reaction;
   (b) applying sonic energy to one of the parts, such energy being dissipated by said material which is raised in temperature thereby, and
   (c) responsive to the dissipation of sonic energy said constituent being caused to undergo its exothermic reaction, such reaction providing a sudden burst of energy which raises the temperature of said material providing the bonding between the two parts.

3. The process of bonding as set forth in claim 2 wherein said sonic energy is in the ultrasonic frequency range.

4. The process of bonding as set forth in claim 2 wherein said sonic energy is produced by an electroaccoustic converter which is coupled to one of the parts.

5. The process of bonding two parts to each other by sonic energy comprising:
   (a) interposing between two parts to be bonded an adhesive material which includes a constituent adapted to undergo an exothermic reaction and adapted to render non-polar surfaces to be bonded polar;
   (b) applying sonic energy to one of the parts, such energy being dissipated by said material which is raised in temperature thereby, and
   (c) responsive to the dissipation of sonic energy said constituent being caused to undergo its exothermic reaction, such reaction providing a sudden burst of energy which raises the temperature of said material and renders polar surfaces non-polar, whereby to provide a bond between the two parts.

References Cited

UNITED STATES PATENTS

| 2,731,573 | 1/1956 | Hansen | 310—8.3 |
| 3,307,997 | 3/1967 | Detrick | 29—498.5 X |
| 3,358,356 | 12/1967 | Long | 29—498.5 |
| 3,367,809 | 2/1968 | Soloff | 156—73 |

FOREIGN PATENTS 544,888  5/1942  Great Britain.

CARL D. QUARFORTH, Primary Examiner

ARTHUR J. STEINER, Assistant Examiner

U.S. Cl. X.R.

29—498.5